United States Patent
Gimat et al.

(10) Patent No.: US 11,772,359 B2
(45) Date of Patent: Oct. 3, 2023

(54) METHOD FOR MANUFACTURING A GUIDE VANE FROM A CERAMIC MATRIX COMPOSITE MATERIAL

(71) Applicant: SAFRAN CERAMICS, Le Haillan (FR)

(72) Inventors: Matthieu Arnaud Gimat, Moissy-Cramayel (FR); Julien André Roger Mateo, Moissy-Cramayel (FR); Clément Marie Benoît Roussille, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/012,149

(22) PCT Filed: Jun. 23, 2021

(86) PCT No.: PCT/FR2021/051148
§ 371 (c)(1),
(2) Date: Dec. 21, 2022

(87) PCT Pub. No.: WO2022/003276
PCT Pub. Date: Jan. 6, 2022

(65) Prior Publication Data
US 2023/0191746 A1 Jun. 22, 2023

(30) Foreign Application Priority Data
Jul. 3, 2020 (FR) .................................... 2007063

(51) Int. Cl.
*B32B 7/04* (2019.01)
*B32B 3/06* (2006.01)
(Continued)

(52) U.S. Cl.
CPC .................. *B32B 7/04* (2013.01); *B32B 3/06* (2013.01); *B32B 5/024* (2013.01);
(Continued)

(58) Field of Classification Search
CPC ..... C04B 37/00; C04B 41/5059; C04B 41/50; C04B 35/565; C04B 35/573; C04B 35/80;
(Continued)

(56) References Cited

U.S. PATENT DOCUMENTS

2020/0109858 A1 4/2020 Whittle
2020/0131919 A1 4/2020 De Diego et al.

FOREIGN PATENT DOCUMENTS

WO WO 2010/116066 A1 10/2010
WO WO 2012/001279 A1 1/2012
(Continued)

OTHER PUBLICATIONS

International Search Report as issued in International Patent Application No. PCT/FR2021/051148, dated Oct. 4, 2021.
(Continued)

*Primary Examiner* — Camie S Thompson
(74) *Attorney, Agent, or Firm* — Pillsbury Winthrop Shaw Pittman LLP

(57) ABSTRACT

A method for manufacturing a turbine nozzle vane made of ceramic matrix composite material, wherein the vane is manufactured using a first fibrous preform including a hollow central section intended to form a fibrous reinforcement of an airfoil of the vane to be obtained, and a pair of second fibrous preforms each having an opening with a shape of the airfoil of the vane to be obtained.

8 Claims, 4 Drawing Sheets

(51) Int. Cl.
    *B32B 5/02*     (2006.01)
    *B32B 37/00*     (2006.01)

(52) U.S. Cl.
    CPC ....... *B32B 37/0038* (2013.01); *B32B 2250/02* (2013.01); *B32B 2305/188* (2013.01); *B32B 2305/80* (2013.01); *B32B 2315/02* (2013.01); *B32B 2603/00* (2013.01)

(58) Field of Classification Search
    CPC . F01D 5/28; F01D 5/284; F01D 5/285; F01D 5/14; F01D 9/04; F01D 9/02; F01D 9/00; B32B 18/00; B32B 7/04; B32B 7/0038; B32B 5/024; B32B 2250/02; B32B 2305/80; B32B 2305/188; B32B 2315/02; B32B 2603/00
    USPC ...................................................... 428/293.4
    See application file for complete search history.

(56) References Cited

FOREIGN PATENT DOCUMENTS

| | | |
|---|---|---|
| WO | WO 2013/079859 A1 | 6/2013 |
| WO | WO 2016/132042 A1 | 8/2016 |

OTHER PUBLICATIONS

Written Opinion of the International Searching Authority as issued in International Patent Application No. PCT/FR2021/051148, dated Oct. 4, 2021.

[Fig. 1]
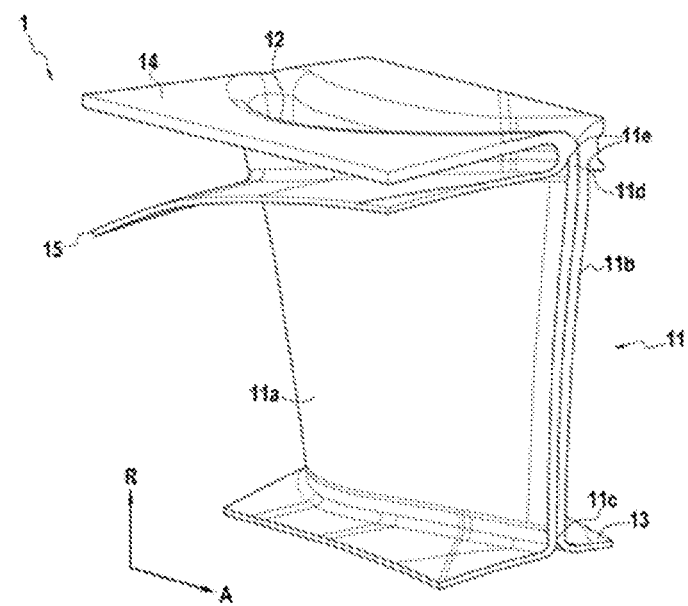
[Fig. 2]

[Fig. 3]
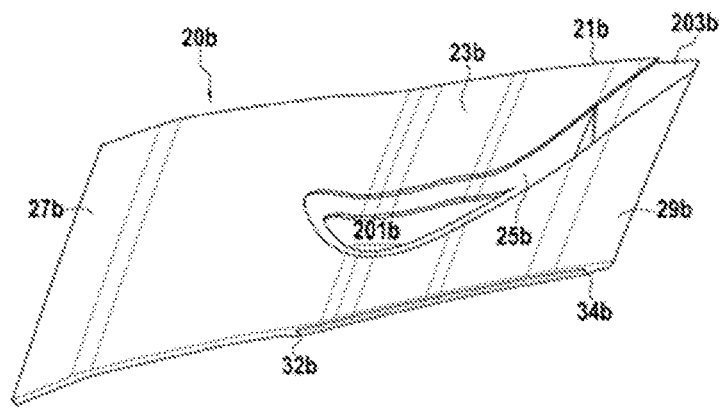
[Fig. 4]
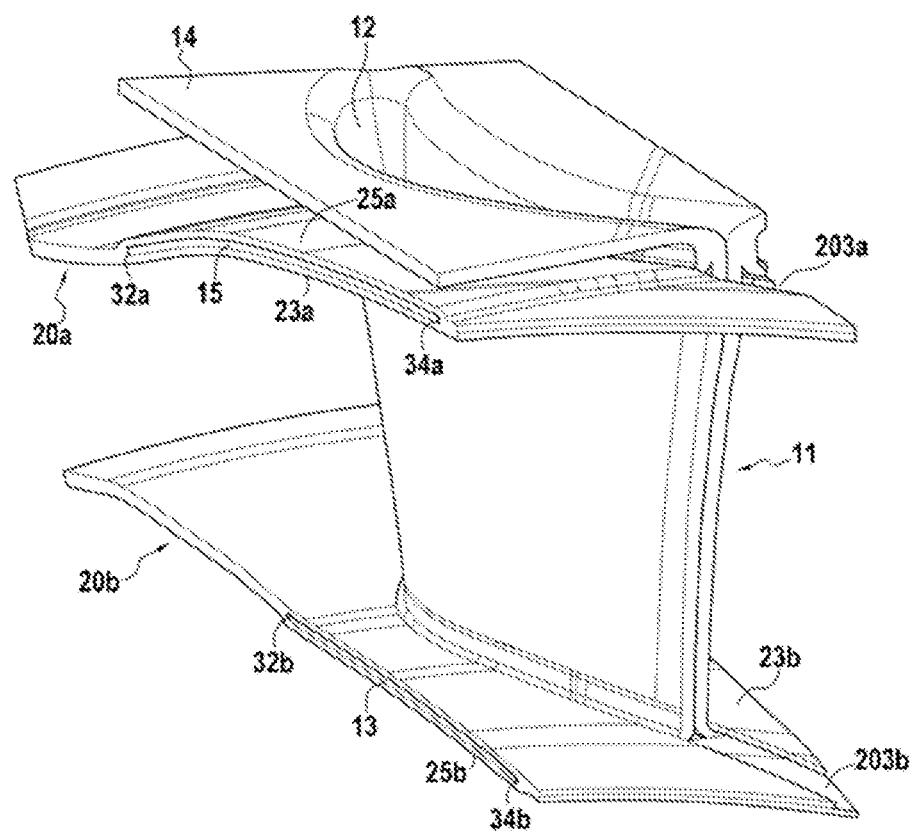

[Fig. 5]
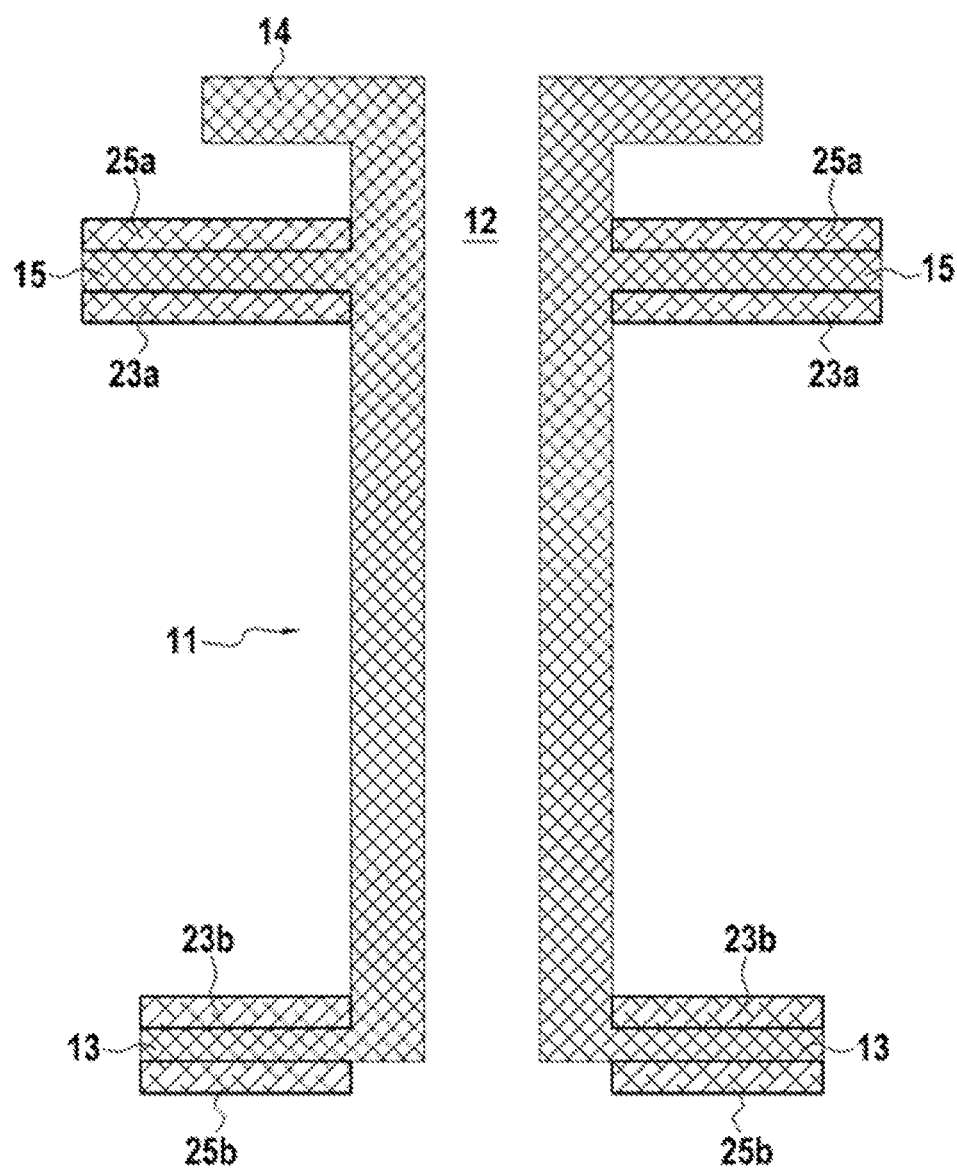

[Fig. 6]
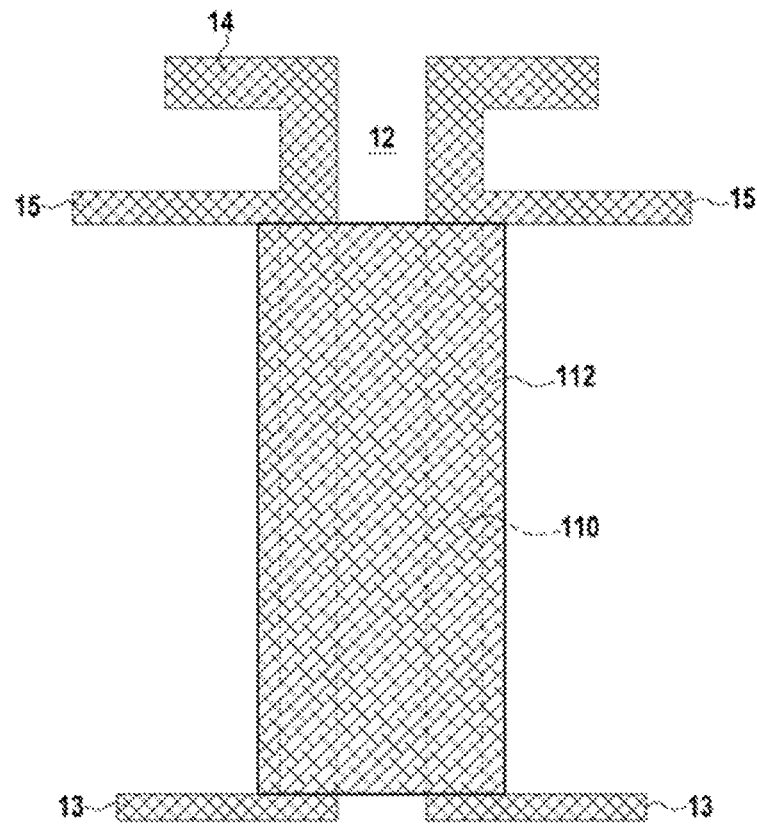
[Fig. 7]
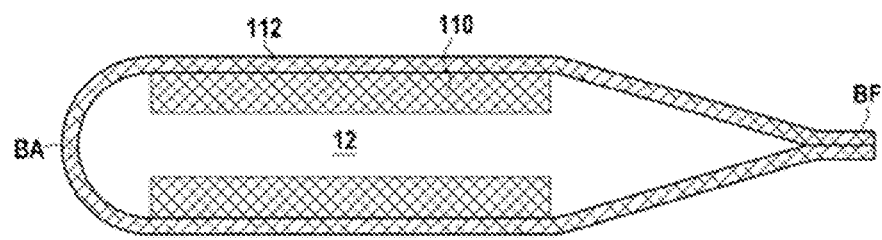

METHOD FOR MANUFACTURING A GUIDE VANE FROM A CERAMIC MATRIX COMPOSITE MATERIAL

CROSS-REFERENCE TO RELATED APPLICATIONS

This application is the U.S. National Stage of PCT/FR2021/051148, filed Jun. 23, 2021, which in turn claims priority to French patent application number 20 07063 filed Jul. 3, 2020. The content of these applications are incorporated herein by reference in their entireties.

TECHNICAL FIELD

The invention relates to the methods for manufacturing turbine nozzle vanes made of ceramic matrix composite material ("CMC material"). These vanes can be intended to be integrated into the nozzles of aeronautical turbomachines or industrial turbomachines.

PRIOR ART

The turbine nozzles are parts linked to the casing of a turbojet engine making it possible to channel and direct the gases in the primary stream. A turbine stage consists of a vane assembly called "nozzle" (or stator), followed by a blade assembly or rotor (set of the turbine disk and the blades). The turbine nozzles are made with hollow-airfoil vanes that is to say with airfoils having an inner longitudinal passage over their entire length between their external and internal ends. Such passages allow conveying an air stream from the exterior to the interior, in particular for the cooling of the turbine rotor wheel disks.

The CMC materials have been proposed as hot section components of a turbomachine. Indeed, these materials have remarkable thermostructural properties, that is to say mechanical properties which make them able to constitute structural components and the ability to maintain these properties at high temperatures. In addition, the CMC materials have a much lower density than that of the metal materials traditionally used for hot section components of turbomachines.

The nozzle is subjected to forces related to the aerodynamic flow in the flowpath and to the piston effect on the casing under the nozzle (difference in pressure between the upstream and downstream cavities under the nozzle). These forces create a moment around the fastening between the nozzle and the casing.

The nozzle vanes must channel the forces through areas ensuring sufficient structural resistance while having a relatively complex shape ensuring various functions such as, in particular, the orientation and the distribution of the gas stream to the downstream stages (aerodynamic profile of the airfoil), the guiding of the streams by the upper and lower flowpaths (platforms) and the supply of the internal casing with cooling air.

It would be desirable to have a method for easily manufacturing a nozzle vane made of CMC material ensuring, in a satisfactory manner, the resistance to the exerted forces as well as the desired functions.

DISCLOSURE OF THE INVENTION

The invention relates to a method for manufacturing a turbine nozzle vane made of ceramic matrix composite material, the method comprising:

the provision of a first fibrous preform comprising (i) a hollow central section intended to form a fibrous reinforcement of an airfoil of the vane to be obtained, (ii) an internal lateral section extending from an internal portion of the central section on each side thereof and transversely thereto, and (iii) an external lateral section extending from an external portion of the central section on each side thereof and transversely thereto, the provision of a pair of second fibrous preforms each having an opening with a shape of the airfoil of the vane to be obtained that opens out onto a first edge of the second fibrous preform considered, each second fibrous preform having two skins bonded on a second edge of the second fibrous preform considered, distinct from the first edge, these skins defining unbonded areas on either side of the opening so as to be able to be spaced apart from each other, the assembly of one of the second fibrous preforms with the first fibrous preform by insertion of the central section into the opening of the second fibrous preform considered and by positioning of the internal lateral section between the skins of the second fibrous preform considered, this assembly being intended to form a fibrous reinforcement of an internal platform of the vane to be obtained, the assembly of the other of the second fibrous preforms with the first fibrous preform by insertion of the central section into the opening of the second fibrous preform considered and by positioning of the external lateral section between the skins of the second fibrous preform considered, this assembly being intended to form a fibrous reinforcement of an external platform of the vane to be obtained, and the securing of the second preforms thus assembled to the first preform by formation of a common ceramic matrix between these preforms.

The separate manufacture of the first preform and the second preforms, which each support a limited number of functions, allows simplifying the manufacture compared to the case where the fibrous reinforcement of the vane is formed in one piece.

Furthermore, the fact of interposing the lateral sections between the skins of the second fibrous preforms allows obtaining an assembly having good resistance to forces in operation.

In one exemplary embodiment, the first fibrous preform is obtained by three-dimensional weaving.

In one exemplary embodiment, the second preforms are woven by three-dimensional weaving, and the skins are woven together on the second edge, the second preforms having a debonding area defining the unbonded areas.

In one exemplary embodiment, the central section of the first preform is extended on the external side of the external lateral section by a portion forming an attachment section preform for the mounting of the vane to be obtained in a casing.

In one exemplary embodiment, the central section of the first fibrous preform is intended to define the aerodynamic profile of the vane to be obtained. As a variant, the first fibrous preform further comprises a profiled fibrous texture added onto the central section and intended to define the aerodynamic profile of the vane to be obtained.

In one exemplary embodiment, the common matrix is formed at least by chemical vapor infiltration ("CVI"). As a variant or in combination, the common matrix is formed at least by liquid process. It is thus for example possible to form a first common matrix phase by chemical vapor infiltration and then a second common matrix phase by liquid process, for example by infiltration in the molten state.

BRIEF DESCRIPTION OF THE DRAWINGS

FIG. 1 is a perspective view of a first fibrous preform implemented in the context of an example of a method according to the invention.

FIG. 2 represents one of the second fibrous preforms which is intended to form the external platform after assembly with the first fibrous preform in the context of the example of the method according to the invention.

FIG. 3 represents another of the second fibrous preforms which is intended to form the internal platform after assembly with the first fibrous preform in the context of the example of the method according to the invention.

FIG. 4 is a perspective view of the assembly obtained after assembly of the second fibrous preforms on the first fibrous preform.

FIG. 5 is a schematic longitudinal sectional view of the assembly illustrated in FIG. 4.

FIG. 6 is a schematic longitudinal sectional view of another variant of a first fibrous preform comprising an added profiled fibrous texture which can be implemented in the context of a method variant according to the invention.

FIG. 7 is a top view of the first fibrous preform illustrated in FIG. 6.

DESCRIPTION OF THE EMBODIMENTS

FIG. 1 is a perspective view of a first fibrous preform 1 that can be used in the context of an example of a method according to the invention.

The first fibrous preform 1 comprises a central section 11 intended to form a structural section of the airfoil of the vane to be obtained. In the example considered here, the central section 11 presents an aerodynamic profile, intended to define the intrados and the extrados of the vane. A first side 11a of the central section 11 is intended to define the extrados, and a second side 11b of the central section 11 is intended to define the intrados. It will be noted that the structural section does not necessarily form the aerodynamic profile of the vane as will be described below in relation to FIGS. 6 and 7.

The central section 11 is a hollow section which has an inner longitudinal passage 12 extending between its internal portion 11c and its external portion 11d. The longitudinal passage 12 is intended to be traversed by the cooling air stream. The first side 11a and the second side 11b delimit the longitudinal passage 12, the longitudinal passage 12 being present between these sides 11a and 11b.

Throughout the text, the terms "internal" and "external" are used with respect to the radial direction (arrow R) with respect to the axis (arrow A) of the nozzle, that is to say to the direction at a radius of the nozzle (straight line connecting the center of the nozzle to its periphery).

The first fibrous preform 1 further comprises an internal lateral section 13 extending from the internal portion 11c on each side thereof and transversely thereto. The first fibrous preform 1 further comprises an external lateral section 15 extending from the external portion 11d on each side thereof and transversely thereto.

In the example illustrated, the central section 11 and the internal 13 and external 15 lateral sections belong to the same fibrous texture obtained by three-dimensional weaving. In this example, there is thus a textile continuity between the central section 11 and the internal 13 and external 15 lateral sections. The internal lateral section 13 and the external lateral section 15 are here defined by folding of the fibrous texture. In the example illustrated, the fibrous texture has a debonding area defined from a debonding bottom 11e. The yarns of the external lateral section 15 are not bonded with the central section 11 in the debonding area.

Furthermore, the central section 11 is, in the example illustrated, extended on the external side of the external lateral section 15 by a portion 14 forming a preform of an attachment section for the mounting of the vane in a casing.

A possible manufacture of the first fibrous preform can first include the production of a fibrous blank in the form of a strip woven by three-dimensional weaving. The yarns used to form the blank can be made of ceramic, in particular silicon carbide (SiC), or carbon.

The weaving of the blank is carried out with a localized debonding at the level of the debonding bottom 11e. In a manner known per se, a debonding is carried out between two layers of warp yarns by failing to pass a weft yarn through the debonding are to bind the layers of warp yarns located on either side of the debonding. Throughout the text, the roles between warp yarns and weft yarns are interchangeable.

After weaving of the blank, cutouts can be made to eliminate the excess portions which are not intended to end up in the first fibrous preform. The blank is then positioned in a shaping tooling to shape it and thus obtain the first fibrous preform 1. The blank can be folded on itself around the shape in order to obtain the central section 11. The blank can thus be folded at the level of the internal section 11c in order to form the lower lateral section 13 and at the level of the external section 11d in order to form the portion 14 forming the attachment section preform.

The external lateral section 15 can be unfolded at the level of the debonding bottom 11e.

The case illustrated relates to a first fibrous preform formed by a single texture obtained by three-dimensional weaving. However, the invention is not limited to this case, the first preform being able, as a variant, to be obtained by draping of a plurality of unidirectional fibrous webs or two-dimensional or three-dimensional fabric strata.

The structure and the manufacture of the first fibrous preform 1 has just been described. The following addresses, in relation to FIGS. 2 and 3, an example of a possible structure for the second fibrous preforms which are intended to be assembled with the first fibrous preform in order to obtain the fibrous reinforcement of the platforms.

The second fibrous preforms 20a/20b each have a similar shape, the following description applies to each of these second preforms 20a/20b.

The second fibrous preform 20a/20b can be formed by a strip obtained by three-dimensional weaving. The second fibrous preform 20a/20b has a debonding area which extends between two debonding bottoms 32a/32b and 34a/34b. This debonding area defines two skins 23a/23b and 25a/25b which can be spaced apart from each other. The two skins 23a/23b and 25a/25b are woven together on opposite longitudinal edges 27a/27b and 29a/29b of the second preform 20a/20b considered. The second fibrous preform 20a/20b has a through opening 201a/201b which has the shape of the airfoil of the vane to be obtained, this opening 201a/201b opens out onto a lateral edge 21a/21b of the second fibrous preform 20a/20b considered at the level of an inlet 203a/203b.

To carry out the assembly of the second fibrous preforms with the first fibrous preform, the central section 11 is inserted into the openings 201a/201b through the inlets 203a/203b and the skins 25a/23a or 25b/23b are spaced apart in order to insert the lateral sections 15 and 13 therebetween in the debonding area of each second fibrous preform. FIG. 4 illustrates the fibrous reinforcement obtained after assembly. The external lateral section 15 is present between the skins 23a and 25a, and the internal lateral section 13 between the skins 23b and 25b. The central section 11 is present in the openings 201a/201b of the second fibrous preforms. The fibrous reinforcement illustrated in FIG. 4 defines both the fibrous reinforcement of the airfoil and the platforms.

It will be noted that during the assembly, the first and the second fibrous preforms may or may not be consolidated. The porosity of a consolidated preform is partially filled by a consolidation matrix phase allowing it to maintain its shape without the assistance of a holding tooling. The first and second preforms can be assembled at different stages, for example the first preform may be consolidated and the second preforms non-consolidated during the assembly. Furthermore, the yarns of the first perform and second preforms may or may not have been coated with an embrittlement-release interphase before assembly. The techniques of formation of an embrittlement-release or consolidation interphase are known per se.

Once the assembly has been completed, a ceramic matrix common to the first and second preforms is then formed.

This common matrix can be produced in whole or in part by chemical vapor infiltration, or in whole or in part by liquid process. The liquid process technique can be a melt infiltration ("MI") or a polymer impregnation pyrolysis ("PIP") technique.

The formation of the ceramic matrix by the techniques mentioned is known per se. it will be noted that a combination of these techniques can be used to form the matrix. The common matrix can include silicon carbide, for example. There may be continuity of the common matrix between the second preforms and the first preform.

After formation of the matrix, a turbine nozzle vane of a turbomachine, for example an aeronautical turbine engine, is obtained. The vane is made of CMC material and comprises an airfoil and internal and external platforms. On the external side of the external platform, the airfoil is extended by an attachment section for the mounting of the vane in a casing. The external face of the internal platform and the internal face of the external platform are intended to delimit the flowpath of gas flow in the nozzle after mounting of the vane in the nozzle. The turbine nozzle can be obtained by mounting a set of vanes as described above in a turbine casing.

FIGS. 6 and 7 illustrate a variant of the first fibrous preform. The same components are referenced in the same way as described above. In this example, the structural section 110 of the vane does not have the shape of the aerodynamic profile of the vane to be obtained. In this example, an additional profiled texture 112 having the aerodynamic profile of the vane to be obtained has been added onto the structural section. This profiled texture 112 particularly defines the leading edge BA and the trailing edge BF of the vane to be obtained.

The invention claimed is:

1. A method for manufacturing a turbine nozzle vane made of ceramic matrix composite material, the method comprising:
   providing a first fibrous preform comprising a hollow central section intended to form a fibrous reinforcement of an airfoil of the vane to be obtained, an internal lateral section extending from an internal portion of the hollow central section on each side thereof and transversely thereto, and an external lateral section extending from an external portion of the hollow central section on each side thereof and transversely thereto,
   providing a pair of second fibrous preforms each having an opening with a shape of the airfoil of the vane to be obtained that opens out onto a first edge of the second fibrous preform considered, each second fibrous preform having two skins bonded on a second edge of the second fibrous preform considered, distinct from the first edge, the skins defining unbonded areas on either side of the opening as to be able to be spaced apart from each other,
   assembling one of the second fibrous preforms with the first fibrous preform by insertion of the hollow central section into the opening of the one of the second fibrous preforms and by positioning of the internal lateral section between the skins of the one of the second fibrous preforms, said assembling being intended to form a fibrous reinforcement of an internal platform of the vane to be obtained,
   assembling the other one of the second fibrous preforms with the first fibrous preform by insertion of the central section into the opening of the other one of the second fibrous preforms and by positioning of the external lateral section between the skins of the other one of the second fibrous preforms, said assembling being intended to form a fibrous reinforcement of an external platform of the vane to be obtained, and
   securing the second preforms thus assembled to the first preform by formation of a ceramic matrix between the first and second preforms.

2. The method according to claim 1, wherein the first fibrous preform is obtained by three-dimensional weaving.

3. The method according to claim 1, wherein the second preforms are woven by three-dimensional weaving, and wherein the skins are woven together on the second edge, the second preforms having a debonding area defining the unbonded areas.

4. The method according to claim 1, wherein the central section of the first preform is extended on the external side of the external lateral section by a portion forming an attachment section preform for the mounting of the vane to be obtained in a casing.

5. The method according to claim 1, wherein the central section of the first fibrous preform is intended to define an aerodynamic profile of the vane to be obtained.

6. The method according to claim 1, wherein the first fibrous preform further comprises a profiled fibrous texture added onto the central section and intended to define an aerodynamic profile of the vane to be obtained.

7. The method according to claim 1, wherein the ceramic matrix is formed at least by chemical vapor infiltration.

8. The method according to claim 1, wherein the ceramic matrix is formed at least by liquid process.

* * * * *